US012001360B2

(12) United States Patent
Thirion et al.

(10) Patent No.: US 12,001,360 B2
(45) Date of Patent: Jun. 4, 2024

(54) DATA TRANSMISSION METHOD AND ELECTRONIC CHIP OF THE MANYCORE TYPE

(71) Applicant: SAFRAN ELECTRONICS & DEFENSE, Paris (FR)

(72) Inventors: Louis-Théophile Thirion, Paris (FR); Sangeerthman Subramaniam, Paris (FR); Nicolas Maitrot, Paris (FR); Jean-Charles Riand, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/798,249

(22) PCT Filed: Feb. 3, 2021

(86) PCT No.: PCT/EP2021/052475
§ 371 (c)(1),
(2) Date: Aug. 8, 2022

(87) PCT Pub. No.: WO2021/160482
PCT Pub. Date: Aug. 19, 2021

(65) Prior Publication Data
US 2023/0075900 A1 Mar. 9, 2023

(30) Foreign Application Priority Data
Feb. 14, 2020 (FR) ...................................... 2001470

(51) Int. Cl.
*G06F 13/22* (2006.01)
*G06F 11/20* (2006.01)
(Continued)

(52) U.S. Cl.
CPC ........ *G06F 13/225* (2013.01); *G06F 13/4221* (2013.01); *G06F 15/7825* (2013.01)

(58) Field of Classification Search
CPC ............................ G06F 13/4282; H04L 67/12
See application file for complete search history.

(56) References Cited

U.S. PATENT DOCUMENTS 10,608,640 B1 * 3/2020 Orthner ............... G06F 13/4282
2007/0057693 A1 3/2007 Reblewski
(Continued)

FOREIGN PATENT DOCUMENTS

| CN | 106713046 A | 5/2017 |
| GB | 2 443 442 A | 5/2008 |
| JP | 2012-075009 A | 4/2012 |

OTHER PUBLICATIONS

Mar. 19, 2021 International Search Report issued in International Patent Application No. PCT/EP2021/052475.
(Continued)

*Primary Examiner* — Getente A Yimer
(74) *Attorney, Agent, or Firm* — Williams Mullen; R. Brian Drozd

(57) ABSTRACT

A method for transmitting data between functions implemented on a first electronic chip of the manycore type. The first electronic chip includes a plurality of execution cores, the execution cores being grouped in clusters, the clusters being interconnected by at least two communication systems. The data transmission method includes the steps of: implementing a first function on a first cluster; implementing a second function on a second cluster, characterised in that the second function is also implemented on a third cluster distinct from the first and second clusters; and transmitting at least one data item between the first function and the second function.

14 Claims, 5 Drawing Sheets

(51) Int. Cl.
    *G06F 13/42*        (2006.01)
    *G06F 15/78*        (2006.01)

(56)                References Cited

U.S. PATENT DOCUMENTS

| | | |
|---|---|---|
| 2016/0283314 A1 | 9/2016 | Thanner et al. |
| 2018/0097747 A1* | 4/2018 | Gauffriau ................ H04L 67/12 |
| 2018/0109531 A1* | 4/2018 | Urmanov ............ H04L 63/0227 |
| 2018/0173466 A1* | 6/2018 | Yang ................... G06F 12/0866 |
| 2018/0261261 A1* | 9/2018 | Giovannini .............. G11C 7/22 |
| 2019/0363727 A1* | 11/2019 | Derks ................... H03M 3/454 |
| 2023/0239244 A1* | 7/2023 | Tian .................... H04L 47/2483 |
| | | 709/224 |

OTHER PUBLICATIONS

Aug. 11, 2022 International Preliminary Report on Patentability issued in International Patent Application No. PCT/EP2021/052475.

* cited by examiner

DATA TRANSMISSION METHOD AND ELECTRONIC CHIP OF THE MANYCORE TYPE

TECHNICAL FIELD

The invention relates to a method for transmitting data between functions implemented on an electronic chip of the manycore type comprising a plurality of execution cores. The invention also relates to an electronic chip of the manycore type.

PRIOR ART

A multicore processor is a processor having at least two cores or computing units etched in the same chip and which work in parallel. A core is a set of circuits capable of executing programs autonomously.

At the present time, there exist so-called "manycore" processors that comprise tens or even hundreds of cores. These cores may be grouped together. A group of cores is known by the English terminology "cluster". Thus a cluster is a set of cores that communicate with each other through a shared memory. The clusters are for their part interconnected by communication systems using various communication techniques (e.g. NoC, the English acronym for "network on a chip", or parallel bus of the AXI type (the English acronym for "Advanced eXtensible Interface")).

Such manycore processors have architecture properties which, in addition to allowing the execution of massively parallel computations, also make it possible to host different functions in terms of criticality and safety, functions that were previously hosted on CPUs and therefore different packages. Thus the use of chips comprising a manycore processor makes it possible to reduce the weight, the size and the electrical consumption of an architecture implementing numerous functions. However, this solution goes along with a loss of reliability related to common failure modes, which is a problem in the case where it is necessary to be able to ensure a high level of safety for a software process, e.g. for controlling the various components of an aircraft. This is because, if a plurality of functions are hosted on the same chip, loss of the chip causes loss of all the functions hosted thereon. The probability of losing a plurality of functions simultaneously is therefore increased, which may be dramatic in the case of an aircraft.

It is therefore desirable to ensure that a cluster or an exchange link between clusters subject to a failure cannot interfere with the correct implementation of another function being executed on another cluster.

DISCLOSURE OF THE INVENTION

According to a first embodiment, a method for transmitting data between functions implemented on a first electronic chip of the manycore type is described. The first electronic chip comprises a plurality of execution cores, said execution cores being grouped in a cluster, said clusters being interconnected by at least two communication systems. The data transmission method comprises the steps of:
 implementing a first function on a first cluster;
 implementing a second function on a second cluster, characterised in that said second function is also implemented on a third cluster different from said first and second clusters; and
 transmitting at least one data item between said first function and said second function.

According to a particular embodiment, transmitting at least one data item between said first function and said second function comprises transmitting a data item between said first function and said second function both on a first communication link belonging to a first communication system and on a second communication link belonging to a second communication system different from said first communication system.

According to a particular embodiment, said first communication system is of the network on a chip type.

According to a particular embodiment, said second communication system is a parallel bus.

According to a particular embodiment, said first electronic chip being interconnected to a second electronic chip of the manycore type distinct from said first electronic chip, said first function is furthermore implemented on a first cluster of said second electronic chip and said second function is furthermore implemented on a second cluster of said second electronic chip.

According to a particular embodiment, said first function implemented on one of said first or second chips transmits at least one data item to said second function implemented on the other of said first or second chips both on a first communication link of the network on a chip type and on a second communication link of the parallel bus type.

According to a particular embodiment, said first electronic chip being interconnected to a third electronic chip of the multicore type, said first function is furthermore implemented on a first core of said third electronic chip and said second function is furthermore implemented on a second core of said third electronic chip.

According to a particular embodiment, said first function transmits at least one data item to said second function both on a first communication link of the Ethernet type and on a second communication link of the PCIe type.

An electronic chip of the manycore type comprising a plurality of execution cores is also described. The execution cores are grouped in clusters, said clusters being interconnected by at least two communication systems. The electronic chip of the manycore type comprises:
 a first cluster on which a first function is implemented;
 a second cluster on which a second function is implemented;
 a third cluster on which said second function is implemented, said third cluster being distinct from said first and second clusters; and
 communication links between said first cluster and said second and third clusters configured for transmitting at least one data item between said first function and said second function.

A system comprising a first electronic chip of the manycore type according to one of the preceding embodiments interconnected to a second electronic chip of the manycore type distinct from said first electronic chip is described. The first function is furthermore implemented on a first cluster of said second electronic chip and the second function is furthermore implemented on a second cluster of said second electronic chip.

A system comprising a first electronic chip according to one of the preceding embodiments interconnected to a third electronic chip of the multicore type distinct from said first electronic chip is described. The first function is furthermore implemented on a first core of said third electronic chip and the second function is furthermore implemented on a second core of said third electronic chip.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1A:
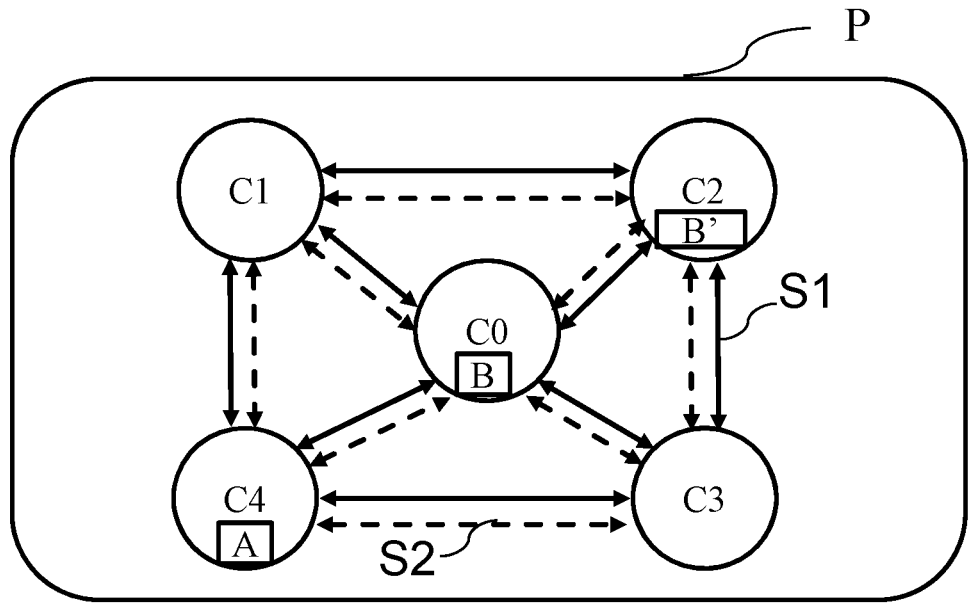
FIG. 1A illustrates an architecture of a component of the manycore type according to a first embodiment.

FIG. 1A illustrates an architecture of a manycore component according to a first embodiment. In one and the same component chip P, a plurality of clusters C0 to C4 are disposed. Each cluster comprises a plurality of cores or computing units. Each core communicates with the other cores of the cluster through a shared memory. The clusters C0 to C4 are interconnected with each other by at least two distinct communication systems S1 and S2. In one embodiment, the two distinct communication systems S1 and S2 are of different designs. On FIG. 1A, the first communication system S1 is shown in solid lines and the second communication system is shown in broken lines S2.

The manycore component may comprise other well known components not shown on FIG. 1A (e.g. cache, memory, ROM, RAM, etc.). In a particular embodiment, the first communication system S1 provides the deterministic routing of the data. This first communication system S1 is typically of the point to point communication type (e.g. NoC, known by the French terminology "réseau sur une puce" ("network on a chip")). All the paths between the clusters being dedicated links, the routing of the data is guaranteed with controlled latency.

NoC is a technique for designing a system for communication between the clusters on the manycore component. A communication system of the NoC type applies the network theories and methods to communications within a component. A communication system of the series bus NoC type has furthermore the advantage of being scalable. It makes it possible to increase the point to point connections between clusters.

In a particular embodiment, the second communication system S2 does not provide this determinism in routing data. On the other hand, it offers the possibility of exchanges via various interfaces. This second communication system S2 is typically of the parallel bus type (e.g. AXI). In this second communication system, the routing of the data is not guaranteed with controlled latency.

Figure 1B:
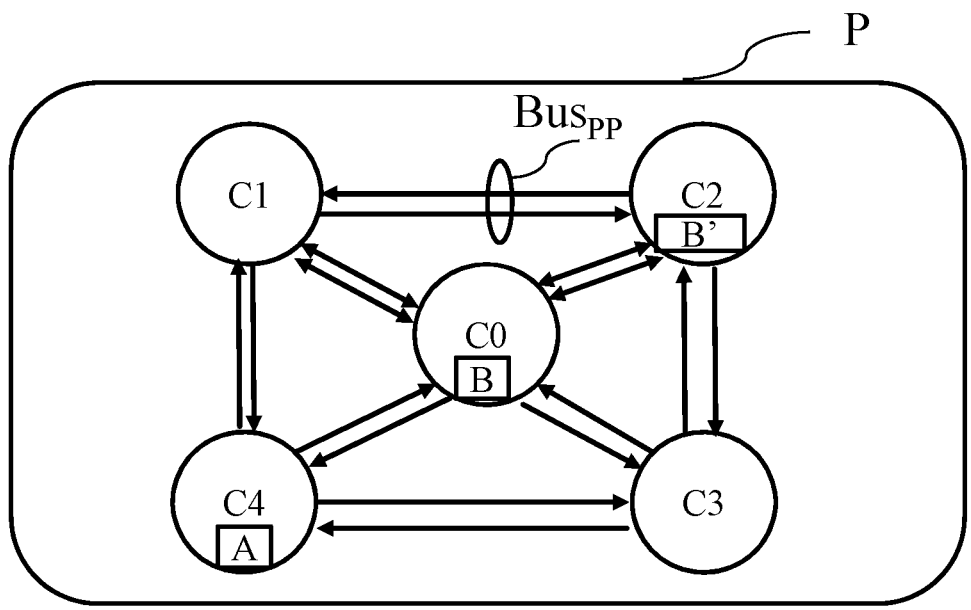
FIG. 1B illustrates an architecture of a component of the manycore type wherein the clusters are connected point to point.

FIG. 1B illustrates such a point to point connection of the clusters C0 to C4. On this FIG. 1B, each pair of arrows represents a connection Buspp between two clusters in point to point. Not all the connections are shown. For example, the cluster C1 may also be connected to the cluster C3 in point to point by a bus of the NoC type.

AXI is a protocol affording interconnection of the clusters by means of a parallel bus. This protocol forms part of the AMBA standard (the English acronym for "Advanced Microcontroller Bus Architecture") developed by the company ARM Limited. The protocol simply establishes the rules for communication between the various modules (e.g. clusters) of a chip.

Figure 1C:
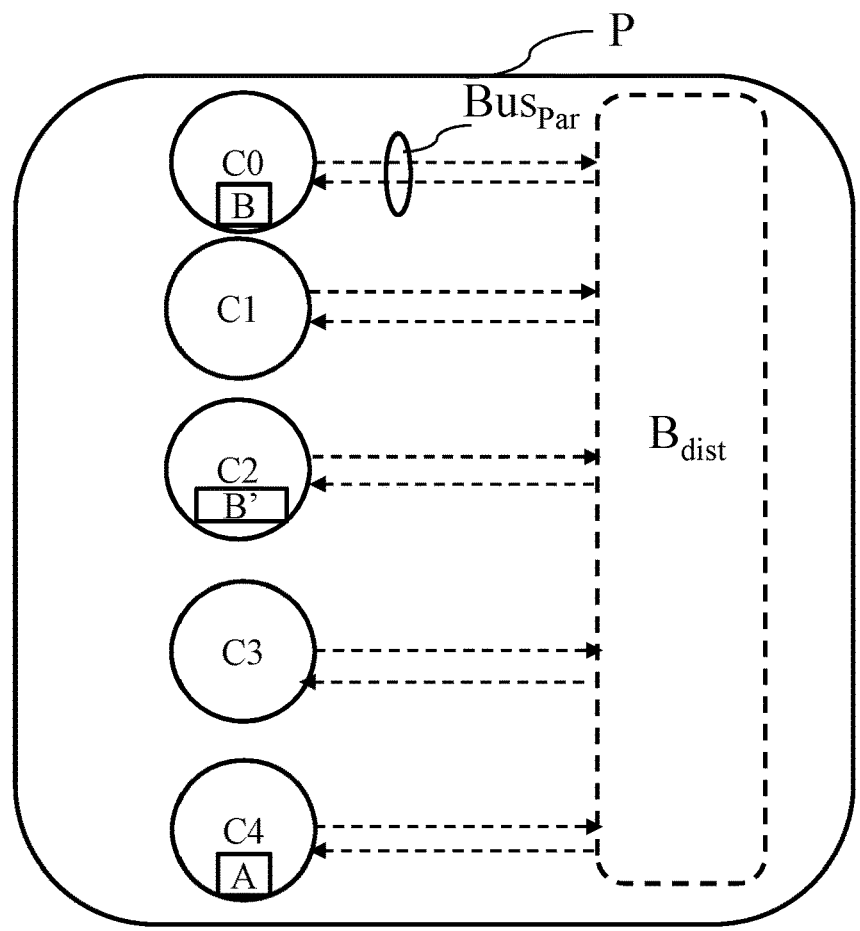
FIG. 1C illustrates an architecture of a component of the manycore type wherein the clusters are connected by parallel bus.

FIG. 1C illustrates such a connection of the clusters C0 to C4 by a parallel bus. On this FIG. 1C, each pair of arrows represents a connection $Bus_{par}$ between a cluster and a distribution bar $B_{dist}$, i.e. a bus intended for distributing data to several types of interface (e.g. DDR, PCxpres, CAN, UART I2C, SPI, etc). Thus the clusters C0 to C4 are interconnected with each other by means of the distribution bar $B_{dist}$.

This chip P is advantageously used for implementing avionic functions that require increased safety. Thus, in an aircraft, several critical functions must exchange data. The data in question are for example flight parameters such as the altitude of the aircraft, its speed, etc. On FIG. 1, a first function A, e.g. monitoring of flight parameters is implemented by a first cluster C4 and a second function B, e.g. managing flight commands, is implemented on a second cluster C0 distinct from the first cluster C4.

According to a particular embodiment, the function B is also implemented on a third cluster C2 distinct from the first and second clusters C4 and C0. The function B implemented on the cluster C2 is called the "redundant" function and is denoted B'. It is indeed the same function as the function B implemented on the cluster C0.

In the event of failure of the cluster C0, the function B implemented on C0 is stopped. By means of the "redundant" function B', correct operation of the avionic system is maintained. This is because the function A can continue to exchange data with the function B' implemented on the cluster C2. The data are for example exchanged by passing from the cluster C4 to the cluster C3 and from the cluster C3 to the cluster C2. The exchanges of data between C4 and C2 via C3 can take place through a communication system internal to the chip, e.g. of the NoC type.

Thus, implementing the function B on two distinct clusters C0 and C2 appreciably improves the reliability of the avionic system. According to a variant embodiment, the function B is implemented on more than two distinct clusters in order to increase the redundancy and therefore the reliability.

However, in the embodiment in FIG. 1A, failure of a link exchanging data between two clusters, e.g. between C2 and C3, or of the communication system of the NoC type overall, may cause stoppage of the avionic system or at least of certain functions that may be critical from a safety point of view.

Figure 2:
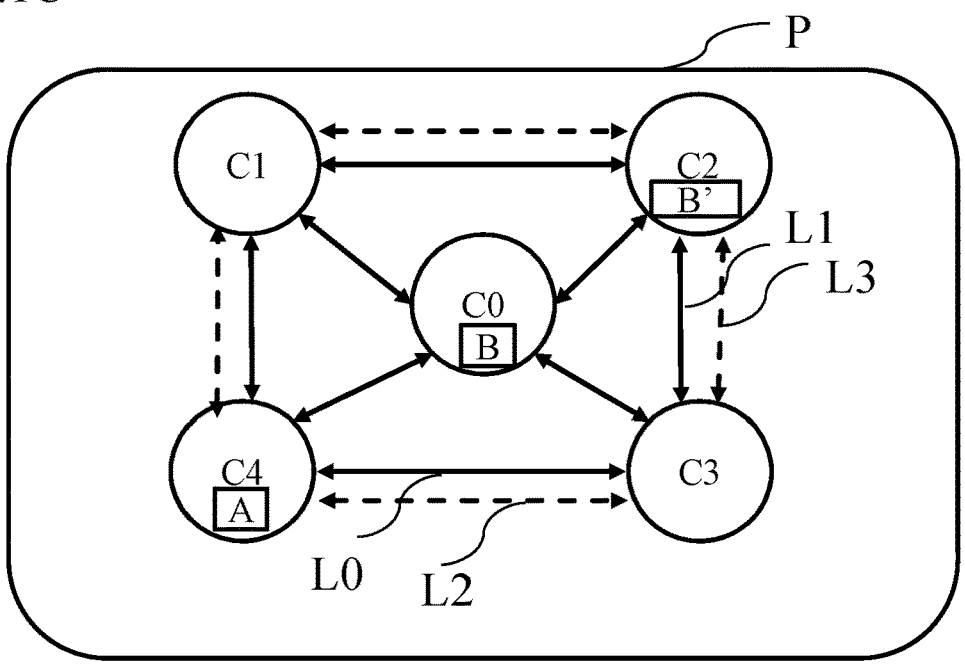
FIG. 2 illustrates an architecture of a component of the manycore type according to a second embodiment.

FIG. 2 illustrates an architecture of a manycore component according to a second embodiment. Within one and the same component or chip P, there are a plurality of clusters C0 to C4. Each cluster comprises a plurality of cores or computing units. Each core communicates with the other cores of the cluster through a shared memory. The clusters C0 to C4 are interconnected with each other by at least two communication systems S1 and S2, e.g. of the NoC and parallel bus type.

According to a particular embodiment, the same data are exchanged on two different communication systems, e.g. on a first system of the NoC type and a second system of the parallel bus type. On FIG. 2, the data exchanges via the first communication system are represented by arrows in solid lines and the data exchanges via the second communication system are represented by arrows in broken lines. Thus, in the event of failure of one of the communication systems overall or of one of the links of this communication system, the second communication system makes it possible to maintain the exchange of data.

For example, when the function A implemented on C4 sends data to the function B' implemented on C2, it sends them via the link L0 and L1 belonging to the first communication system and also via the links L2 and L3 belonging to the second communication system.

Thus, in the event of failure of the first communication system, e.g. of the NoC type, the data exchanges continue via the second communication system, e.g. parallel bus of the AXI type.

According to another example, in the event of failure of the link L2 between the cluster C3 and cluster C4 of the second communication system, the data exchanges can continue on the other link L0 belonging to the first communication system.

In the case where no failure occurs, the function B' may where applicable receive the same data twice, i.e. once for each communication system. Consequently, it may be decided that the function B' uses only the data received first and therefore ignores the same data received second. According to a variant, priority may be given to one communication system compared with the other. Thus, if the priority is given to the first communication system and the function B' receives data coming from the function A via these two communication system, they use the data coming from the first communication system and ignore the data coming from the second communication system.

According to a variant embodiment, the data between two clusters are exchanged by means of more than two different communication systems in order to increase the redundancy and therefore the reliability.

The communication systems of the NoC and parallel bus type are given by way of simple illustrative examples. Other communication systems operating according to other communication protocols and allowing the exchange of data between clusters can be used in place of or in addition to the communication systems of the NoC and parallel bus type.

Figure 3:
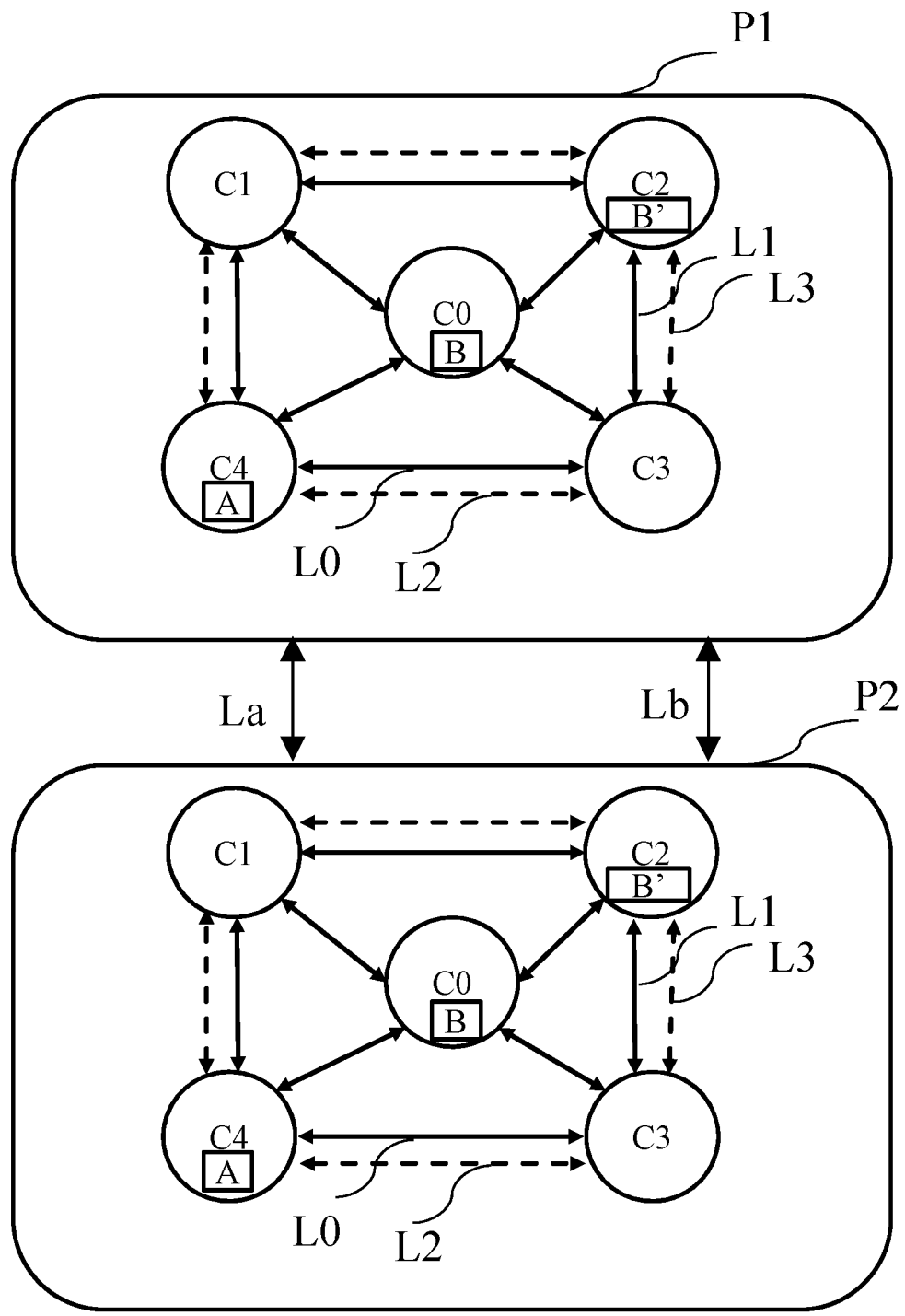
FIG. 3 illustrates a system comprising two components of the manycore type according to a particular embodiment.

FIG. 3 illustrates a system comprising two manycore components according to a particular embodiment. The system comprises a first manycore component P1 and a second manycore component P2, which are interconnected by at least two communication links La and Lb.

Each component P1 and P2 comprises a plurality of clusters, C0 to C4. Each cluster comprises a plurality of cores or computing units. Each core communicates with the other cores of the cluster through a shared memory. The clusters C0 to C4 are interconnected together by at least two communication systems S1 and S2, e.g. of the NoC and parallel bus type.

Associating a plurality of manycore components makes it possible to avoid common failure modes. Thus, in the event of failure of the component P1, the functions A and B are provided by the component P2.

In another example of operation, the function A implemented on the component P1 can exchange data with the function B or B' located on the same component P1 according to the embodiments described with reference to FIGS. 1 and 2. Furthermore, the function A implemented on the component P1 can exchange data with the function B implemented on the second component P2 by means of the link La of a first communication system (e.g. of the NoC type) or by means of the link Lb of a second communication system (e.g. parallel bus). In this embodiment, the components exchange the data via at least two communication systems, e.g. of the NoC and parallel bus type as illustrated on FIG. 3.

According to a variant embodiment (not shown on FIG. 3), the function B can also be implemented in the component P2 on another cluster distinct from C2 on which it is already implemented in order to increase the redundancy and therefore the reliability of the system.

Figure 4:
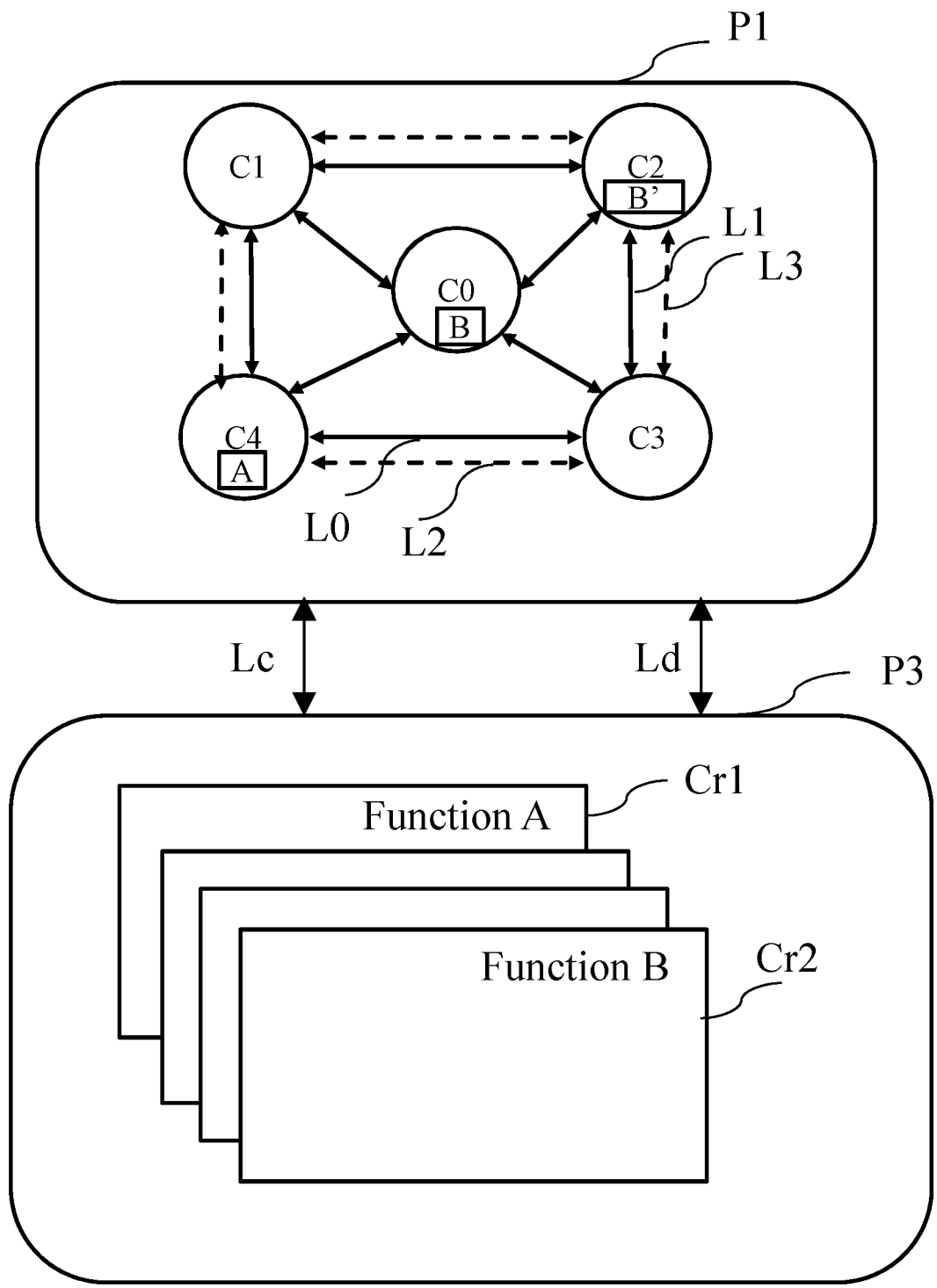
FIG. 4 illustrates a system comprising two components, a manycore component and a component of the multicore type, according to a particular embodiment.

FIG. 4 illustrates a system comprising two components according to a particular embodiment. The system comprises a first manycore component P1 and a second multicore component P3 that are interconnected by at least two communication links Lc and Ld.

The component P1 comprises a plurality of clusters, C0 to C4. Each cluster comprises a plurality of cores or computing units. Each core communicates with the other cores of the cluster through a shared memory. The clusters C0 to C4 are interconnected with each other by at least two communication systems S1 and S2, e.g. of the NoC and parallel bus type.

The component P3 is a multicore component, e.g. quad-ricore as illustrated on FIG. 4. Associating a plurality of components implementing different technologies makes it possible to avoid common failure modes. Thus, in the event of failure of the component P1, the functions A and B are provided by the component P3. In the case where the two components P1 and P3 use identical technologies and/or are of the same make, the probability of the two components no longer operating at the same time would be increased.

In another example of operation, the function A implemented on the component P1 can exchange data with the function B or B' located on the same component P1 according to the embodiments described with reference to FIGS. 1 and 2. The function A implemented on the component P1 can furthermore exchange data with the function B implemented on the second component P3 via a first communication system using for example links Le, e.g. of the Ethernet type, or via a second communication system using for example links Ld, e.g. of the PCIe type (the English acronym for "Peripheral Component Interconnect Express"). To pass through the link Lc, NoC is used, and to pass through the link Ld the parallel bus is used.

Other technologies can be used for exchanging data between the two chips, such as GPIO (the English acronym for "General Purpose Input/Output"), USB (the English acronym for "Universal Serial Bus"), or CAN (the English acronym for "Controller Area Network").

In this embodiment, the components exchange the data by means of the links Lc and Ld of at least two communication systems.

In another embodiment, the first manycore component P1 is connected both to a manycore component P2 and to a multicore component P3 by means of at least two communication systems in order to increase the redundancy of function and also the redundancy of the communication links.

Figure 5:
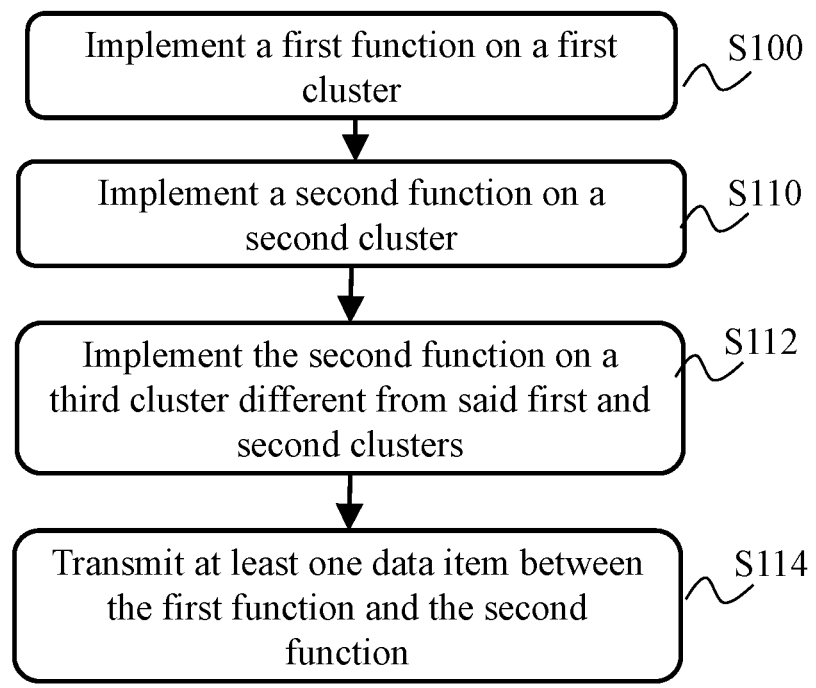
FIG. 5 illustrates schematically a method for transmitting data between functions implemented on an electronic chip of the manycore type comprising a plurality of execution cores.

FIG. 5 illustrates schematically a method for transmitting data between functions implemented on a first electronic chip of the manycore type comprising a plurality of execution cores, said execution cores being grouped in clusters according to a particular embodiment.

In a step S100, a first function is implemented on a first cluster of a manycore electronic component, said first function exchanging data with a second function.

In a step S110, the second function is implemented on a second cluster distinct from the first cluster.

In a step S112, the second function is also implemented on a third cluster distinct from said first and second clusters.

In a step S114, at least one data item is transmitted between said first function and said second function. According to a particular embodiment, said data item is transmitted twice, both on a first communication link belonging to a first communication system and on a second communication link belonging to a second communication system different from said first communication system.

The variant embodiments described with reference to FIGS. 1 to 4 also apply to the data transmission method.

The invention claimed is:

1. A method for transmitting data between functions implemented on a first electronic chip of the manycore type comprising a plurality of execution cores, said execution cores being grouped in a cluster, a plurality of clusters (C0 to C4) being interconnected by at least one first communication system and a second communication system different from said first communication system, wherein said method causes the first electronic chip to perform:
   implementing a first function (A) on a first cluster (C1);
   implementing a second function (B) on a second cluster (C2), wherein said second function (B') is also implemented on a third cluster (C3) distinct from said first and second cluster; and
   transmitting at least one data item between said first function and said second function, implemented on the second cluster and said second function implemented on the third cluster both through said first communication system and through said second communication system so that in the event that said first communication system fails, the second function (B') implemented on the third cluster (C3) will still receive the at least one data item through said second communication system.

2. The method according to claim 1, wherein the first communication system comprises a first communication link (L1) and the second communication system comprises a second communication link (L2), and wherein transmitting at least one data item between said first function and said second function comprises transmitting a data item between said first function and said second function both on the first communication link belonging to the first communication system and on the second communication link belonging to the second communication system.

3. The method according to claim 1, wherein, one of said communication systems having priority, in the case of a plurality of receptions of said data item by said second function implemented on said second cluster only the data item received through said priority communication system is kept and in the case of a plurality of receptions of said data item by said second function implemented on said third cluster only the data item received through said priority communication system is kept.

4. The method according to claim 1, wherein said first communication system is of the network on a chip type.

5. The method according to claim 1, wherein said second communication system is a parallel bus.

6. The method according to claim 1, wherein, said first electronic chip being interconnected to a second electronic chip of the manycore type distinct from said first electronic chip, said first function is furthermore implemented on a first cluster of said second electronic chip and said second function is furthermore implemented on a second cluster of said second electronic chip.

7. The method according to claim 6, wherein said first function implemented on one of said first or second chips transmits at least one data item to said second function implemented on the other of said first or second chips both on a first communication link of the network on a chip type and on a second communication link of the parallel bus type.

8. The method according to claim 1, wherein, said first electronic chip being interconnected to a third electronic chip of the multicore type, said first function is furthermore implemented on a first core of said third electronic chip and said second function is furthermore implemented on a second core of said third electronic chip.

9. The method according to claim 8, wherein said first function implemented on one of said first or second chips transmits at least one data item to said second function implemented on the other one of said first or second chips both on a first communication link of the Ethernet type (Lc) and on a second communication link of the PCIe type.

10. An electronic chip of the manycore type comprising a plurality of execution cores, said execution cores being grouped in clusters, said clusters (C0 to C4) being interconnected by at least one first communication system and a second communication system different from said first communication system, the electronic chip comprising:
   first cluster (C1) on which a first function (A) is implemented;
   second cluster (C2) on which a second function (B) is implemented;
   a third cluster (C3) on which said second function (B') is implemented, said third cluster being distinct from said first and second clusters; and
   communication links between said first cluster and said second and third clusters configured for transmitting at least one data item between said first function and said second function implemented on the second cluster and said second function implemented on the third cluster both through said first communication system and through said second communication system so that in the event that said first communication system fail, the second function (B') implemented on the third cluster (C3) will still receive that at least one data item through said second communication system.

11. A system comprising a first electronic chip according to claim 10 interconnected to a second electronic chip of the manycore type distinct from said first electronic chip, wherein said first function is furthermore implemented on a first cluster of said second electronic chip and said second function is furthermore implemented on a second cluster of said second electronic chip.

12. A system comprising a first electronic chip according to claim 10 interconnected to a third electronic chip of the multicore type distinct from said first electronic chip, wherein said first function is furthermore implemented on a first core of said third electronic chip and said second function is furthermore implemented on a second core of said third electronic chip.

13. The system according to claim 11, wherein said first communication system is of the network on a chip type.

14. The system according to claim 11, wherein said second communication system is a parallel bus.

* * * * *